United States Patent [19]
Payne et al.

[11] Patent Number: 6,160,944
[45] Date of Patent: Dec. 12, 2000

[54] OPTICAL WAVEGUIDE DEVICE

[75] Inventors: David Neil Payne, Southampton; Liang Dong, Leatherhead, both of United Kingdom; Jose Luis Cruz, Valencia, Spain

[73] Assignee: University of Southampton, Southampton, United Kingdom

[21] Appl. No.: 08/945,475

[22] PCT Filed: Apr. 29, 1996

[86] PCT No.: PCT/GB96/01030

§ 371 Date: Jan. 30, 1998

§ 102(e) Date: Jan. 30, 1998

[87] PCT Pub. No.: WO96/34304

PCT Pub. Date: Oct. 31, 1996

[30] Foreign Application Priority Data

Apr. 28, 1995 [GB] United Kingdom .................... 9508712

[51] Int. Cl.[7] .................................................. G02B 6/10
[52] U.S. Cl. .......................................................... 385/129
[58] Field of Search .................................. 385/129, 142, 385/144

[56] References Cited

U.S. PATENT DOCUMENTS 5,349,473  9/1994  Kurasawa et al. ...................... 385/142

FOREIGN PATENT DOCUMENTS 0 495 605 A2   7/1992   European Pat. Off. .
0 569 182     11/1993   European Pat. Off. .
94/00784       1/1994   WIPO .

OTHER PUBLICATIONS

G.M. Williams et al., Permanent Photowritten Optical Gratings in Irradiated Silicate Glasses, Apr. 1, 1992, pp. 532–534.

E.G. Behrens et al., Characteristics of Laser–induced Gratings in Pr3+—and Eu3+—Doped Silicate Glasses, Aug. 1990, pp. 1437–1444.

G.R. Atkins et al., Photodarkening in Tb3+—Doped Phosphosilicate and Germanosilicate Optical Fibers, Jun. 15, 1994, pp. 874–876.

L. Dong et al., Enhanced Photosensitivity in Tin–Codoped Germanosilicate Optical Fibers, Sep. 1995, pp. 1048–1050.

L. Dong et al., Strong Photosensitive Gratings in Tin–Doped Phosphosilicate Optical Fibers, Oct. 1, 1995, pp. 1982–1984.

Primary Examiner—Leon Scott, Jr.
Attorney, Agent, or Firm—Renner, Otto, Boisselle & Sklar LLP

[57] ABSTRACT

Tin-doped photosensitive optical glass is disclosed, together with applications of the glass in fabricating waveguides and waveguide devices such as Bragg gratings.

21 Claims, 5 Drawing Sheets

OPTICAL WAVEGUIDE DEVICE

This invention relates to optical waveguide devices.

Certain types of glass used for fabricating optical waveguides (such as optical fibres) and waveguide devices (such as Bragg gratings) are known to have a substantially permanent refractive index change when exposed to optical radiation. These types of glass are known as photosensitive (or photorefractive) glass, and the photosensitive properties are often induced by doping the glass with one or more dopant materials. Therefore, the term "photosensitive" is used here in the established context within the field of optical devices, namely that the refractive index of a photosensitive glass may be modified by exposure to optical radiation, with the modified refractive index material still being a glass.

The radiation used to initiate the refractive index change is normally in the ultraviolet (UV) or visible ranges; however, it can also be infrared.

One example of a photosensitive glass is germanium-doped silica glass. (The term "silica" glass is used in the conventional way to describe glasses which may contain one or more dopants but which are chemically compatible with glasses formed of substantially pure silica, which can be drawn into fibres, and which are typically (but not exclusively) formed by a chemical vapour deposition (CVD) process, a "sol-gell" process in which a liquid organosilicate is dried to form the glass, or possibly by an initial CVD process to produce a base glass followed by a solution doping process. Accordingly, the term encompasses many families of doped glasses which are based on silica. Here, the term is used to describe glasses in which the largest single component is silica). In one use, periodic optical radiation patterns can be imprinted into such a glass to form refractive index gratings, which can then selectively reflect/diffract light at a wavelength/angle determined by the period and incident angle, if the light is directed onto the gratings. One of the examples is a reflection grating in an optical waveguide which has a periodically-varying index pattern located along its axis, and which selectively reflects light at a wavelength equal to $2n\Delta$ (n is the effective refractive index of the guided optical mode and $\Delta$ is the period of the index modulation).

Waveguide gratings of this type have many applications. They can be used in wavelength-division-multiplexed systems as channel add-and-drop filters, as narrow-band reflectors for fibre lasers, as transmission filters, as optical strain/temperature sensors, or as modal couplers. Chirped gratings have been used for dispersion compensation in optical fibre links, for pulse compression and broadening.

The periodic optical radiation pattern for imprinting gratings into the glass can be generated in many ways. It can be easily produced by two interfering optical beams (publication reference 1 below). The angle between the two beams can be changed to adjust the period of the gratings. Another method is to direct the beam from a radiation source perpendicularly through a phase mask (reference 2 below). The phase mask consists of many periodic grooves on a silica substrate, and the image of the periodic pattern on the phase mask is then formed in space behind the phase mask. A third method is point-to-point writing with a tightly focused beam moving in steps, and this method is particularly useful for writing gratings with large periods (larger than tens of micrometers ($\mu$ms)), for which the previous method using interfering beams is rendered impossible because of the small angle between the beams required for such large periods.

In a waveguide, light is largely confined within a high-index region (hereinafter called the core) and a lower index region surrounds the core (hereinafter called the cladding). For waveguide gratings, the photosensitive glass can form either the core or the cladding or both. Preferably the core glass consists of the photosensitive glass since most of the light is confined within the core, and therefore there is a large overlap between the grating and the light.

The known photosensitive germanium-doped silica glass has an absorption band centred around 240 nanometers (nm), related to oxygen-deficient centres in the glass. When radiation with wavelength around 240 nm (or around 480 nm if two-photon absorption occurs) is absorbed, a permanent change in the refractive index of the glass is produced. The exact mechanism of the effect has not been fully established, although it is probably due to the formation of defect centres, small structural changes, optical damage or any combination of the three.

A high germanium content in the core is desirable to give a large photosensitivity, although this leads to fibres having a large numerical aperture and small spot-size which does not match well to other optical waveguides and produces large jointing losses. This disadvantage can be at least partially offset by co-doping with boron which acts in the opposite sense to germanium and reduces the core refractive index, as well as in itself increasing the photosensitivity (see reference 3 below).

A number of other dopants can also be used to produce photosensitive glass, such as cerium (reference 4 below), praseodymium (reference 5 below), and europium (reference 6 below), but they do not exhibit as strong a photosensitivity as germanium-doped glass.

Some post-fabrication techniques have also been devised to enhance the photosensitivity of germanium-doped fibres. Hydrogen/oxygen ($H_2/O_2$) flame-brushing of a germanium doped fibre can enhance the photosensitivity (reference 7 below). Low-temperature hydrogen loading has enabled very strong gratings to be written in germanium-doped fibre (reference 8 below), and also allows gratings to be written in some germanium-free fibres (reference 9 below). Apart from the time disadvantage with these techniques (flame brushing takes tens of minutes, low temperature hydrogen loading takes days), there are strong losses induced with the low-temperature hydrogen loading technique, especially at the shorter wavelengths.

Apart from the need to write gratings in passive waveguides, there is also a need to write gratings in active waveguides, i.e. fibres or planar waveguides doped with rare-earth ions for application in single-frequency fibre lasers and fibre distributed-feedback lasers, where gratings have to be written directly in the active fibre because of the short device length (centimeters or less) (reference 10 below). Unfortunately many of these fibres contain phosphorous, which is known to suppress the photo-induced index change in a germanium-doped fibre because it reduces the intensity of the 240 nm absorption band in these fibres, a band which is closely related to the photosensitivity of germanium-doped waveguides (reference 11 below).

Publication reference 15 discloses an optical waveguide device in which a refractive index variation is optically induced in a waveguide formed at least in part of photosensitive optical glass.

In summary, previous waveguide devices using photosensitive glass, and previous photosensitizing dopants, have suffered from various disadvantages relating to the doping process or the eventual optical properties of the doped glass.

This invention provides an optical waveguide device in which a refractive index variation is optically induced in a waveguide formed at least in part of photosensitive optical glass, characterised in that the photosensitive optical glass is tin-doped photosensitive optical glass.

In preferred embodiments of the invention, the device is a grating such as a substantially uniformly periodic Bragg grating or a non-uniform period chirped grating. However, in other embodiments the device could be a beam size adjusting device, in which a non-cyclic (e.g. linear) refractive index variation is generated along a length of waveguide to change the size of the guided beam, an amplifier or laser, or other types of optical device requiring an optically induced refractive index variation.

This invention also provides a process for increasing the sensitivity of optical glass to light-induced refractive index variation, the process comprising the step of doping the optical glass with tin.

Further aspects and preferred features of the invention are defined in the appended claims. Preferred features of each aspect of the invention are also applicable to other aspects of the invention.

Embodiments of the invention can provide a number of advantages over previous doped glasses for optical waveguides:

1. Tin ($SnO_2$-) doping can enable strong gratings to be written in phosphorous-containing glass without using the low-temperature hydrogen-loading technique. Phosphorous-containing glass is particularly important for the construction of rare-earth-doped waveguide lasers and amplifiers.

2. $SnO_2$-doped germanosilicate glass has an much lager UV-induced index change compared with solely $GeO_2$-doped glass (a factor of 3 has been demonstrated in prototypes) and is comparable with $B_2O_3$-doped germanosilicate glass.

3. UV-written gratings in $SnO_2$-doped germanosilicate glass can be more stable that those in $B_2O_3$-doped germanosilicate glass. $SnO_2$-doped germanosilicate glass can also have considerably lower loss than that of $B_2O_3$-doped germanosilicate glass, particularly at the telecommunication wavelength of 1.55 $\mu$m (a loss of 1 dB/km has been demonstrated with a prototype).

4. The wavelength at which the gratings can be written is less restricted in $SnO_2$-doped glass than for germanosilicate glass or $B_2O_3$-doped germanosilicate glass, both of which require a narrow band of wavelengths centred around 240 nm.

5. $SnO_2$ is easily incorporated into optical fibres using a vapour-phase-deposition fabrication process.

6. The germania-based glass used in standard telecommunications fibre (about 3.7% germania-doped silica glass) can be tin-doped to improve its sensitivity to phot-induced refractive index variation without significantly altering other properties of glass. Thus, optical devices relying on photo-induced refractive index variation can be made which are very well optically matched to other components constructed using non-tin-doped standard telecommunications fibre.

In a first preferred embodiment, the glass contains $SnO_2$, and at least one other component taken from $SiO_2$, $P_2O_5$, $GeO_2$ and $B_2O_3$. In a second preferred embodiment, the glass contains $SnO_2$, and at least one of $SiO_2$, $GeO_2$ and $B_2O_3$. Both glasses can also optionally be doped with rare earths to form a lasing or amplifying medium. However, in a broadest aspect of the invention, tin may be used as the only dopant.

The first embodiment glass is particularly appropriate for making photosensitized rare-earth-doped phosphorsilicate glass, as no such glass has previously been demonstrated without using the hydrogen loading technique.

The two glasses can be used to make core or cladding (or both) in an optical waveguide and are particularly appropriate for optical fibres made by vapour-phase deposition techniques, since $SnCl_4$ is a volatile liquid at room temperature and can be easily incorporated into the process. Alternatively, $SnO_2$ can be incorporated using the solution-doping technique (the basic technique being described in reference 12 below). $SnO_2$ doping does not substantially affect the loss of the optical fibres around the telecommunication windows of 1.3 $\mu$m and 1.55 $\mu$m.

This invention also provides a method of fabricating an optical waveguide, the method comprising the step of exposing regions of tin-doped photosensitive optical glass to refractive-index change inducing optical radiation, the exposed regions providing a light-guiding core of raised refractive index within the tin-doped optical glass.

Embodiments of the invention will now be described by way of example only, with reference to the accompanying drawings in which.

Figure 1:
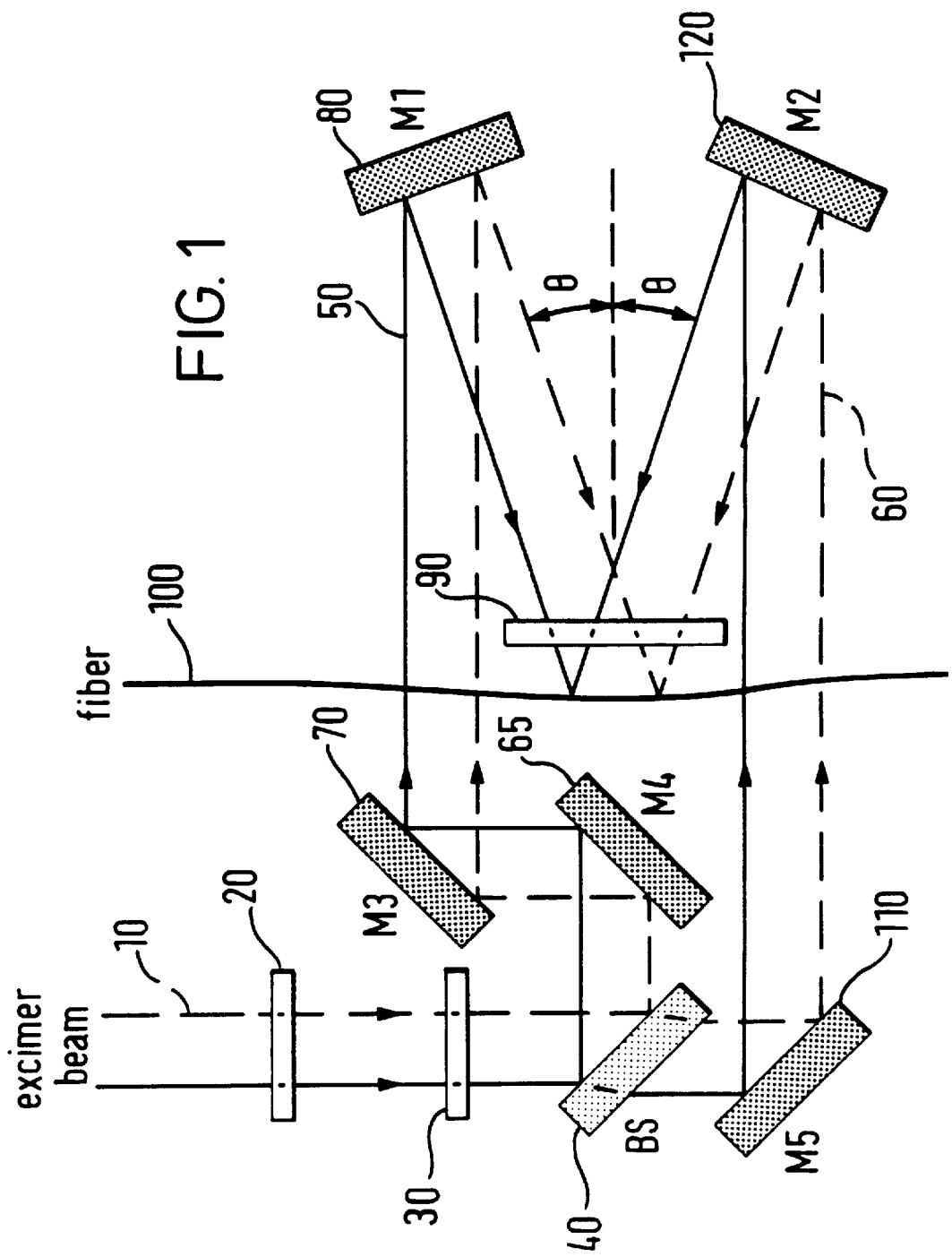
FIG. 1 is a schematic diagram showing an interferometric apparatus for writing gratings with an excimer laser.

The interferometer receives a pulsed beam of ultraviolet (UV) light from an excimer laser such as the Lambda Physik ENG-150 krypton-fluoride (KrF) excimer laser (not shown). The pulse energy is monitored by a pyroelectric energy meter (not shown) which receives a portion of the beam tapped off by a fused silica optical flat (not shown). In response to the pulse energy detected by the pyroelectric energy meter, the pulse energy of the excimer beam 10 is controlled using a half-wave plate and polarizer arrangement (not shown) having a variable transmission loss.

The excimer beam 10 is passed through two cylindrical lenses 20, 30 before being supplied to a beam splitter 40. The beam splitter 40 splits the excimer beam 10 into two substantially equal beams 50 and 60. The beam 50, representing the portion of the beam reflected by the beam splitter 40, is then reflected from three mirrors 65, 70 and 80 before impinging on an optical fibre 100. Similarly, the beam 60, which represents the portion of the excimer beam 10 transmitted by the beam splitter 40, is reflected by two mirrors 110, 120 before impinging on the optical fibre 100. The beam 50 and the beam 60 are transversely incident on the optical fibre 100 at angles of incidence of ±θ.

Figure 2:
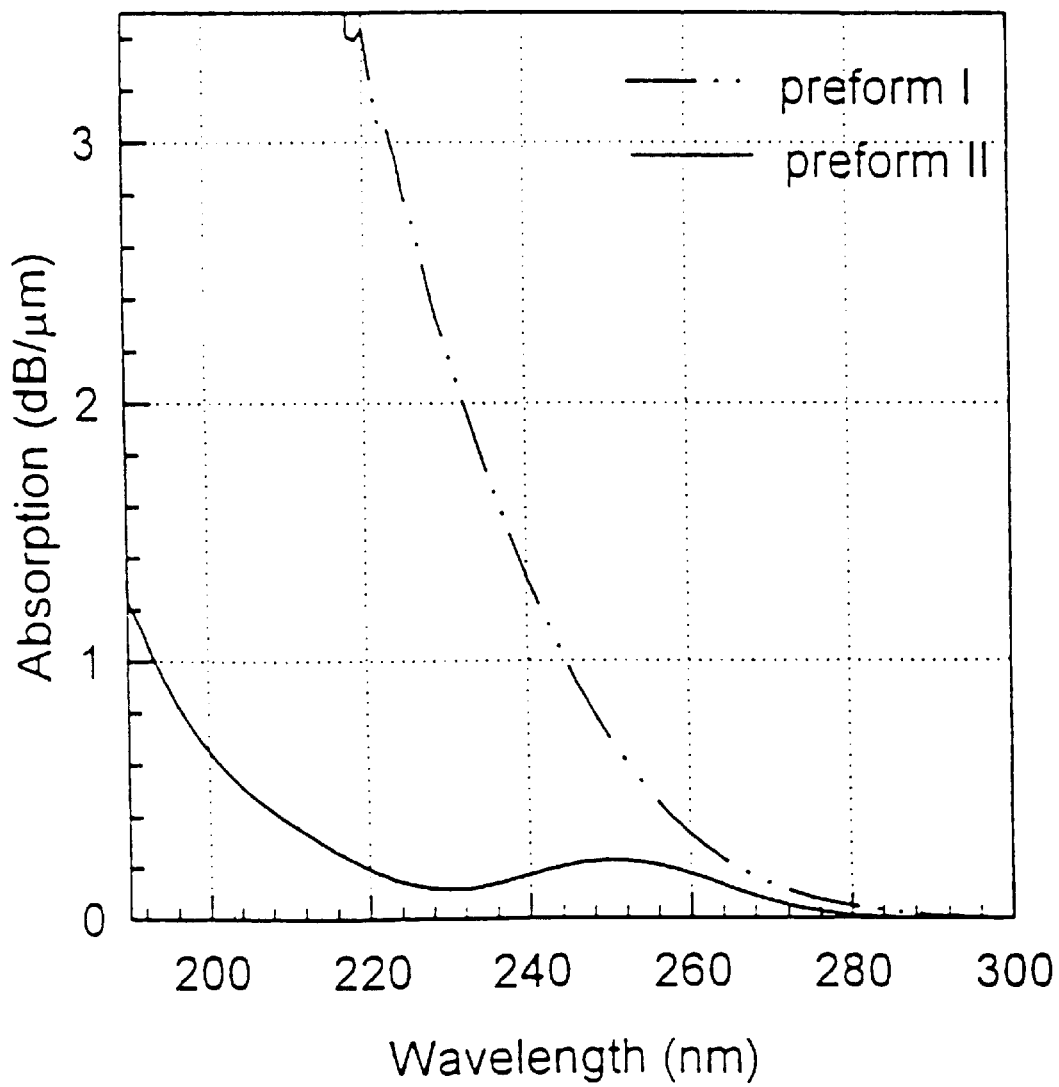
FIG. 2 is a schematic graph showing the UV absorption spectra measured in a glass containing $SnO_2$, $P_2O_5$ and $SiO_2$ (preform I) and a glass containing $SnO_2$, $GeO_2$ and $SiO_2$ (preform II)

FIG. 2 is a schematic graph showing the UV absorption spectra measured in a glass containing $SnO_2$, $P_2O_5$ and $SiO_2$ (preform I) and a glass containing $SnO_2$, $GeO_2$ and $SiO_2$ (preform II);

The first glass (hereinafter called glass I) is a glass consisting essentially of $SnO_2$, $P_2O_5$ and $SiO_2$ although $B_2O_3$ or F can also be introduced to achieve a lower index. A preferred composition contains:

1–30 mol % of $SnO_2$
0–40 mol % of $P_2O_5$

0–40 mol % of $B_2O_3$
0–30 mol % of $GeO_2$
>50 mol % of $SiO_2$ (i.e. the remainder)
[A further refined form of this composition may be defined as follows:
1–15 mol % of $SnO_2$
0–20 mol % of $P_2O_5$
0–20 mol % of $B_2O_3$
0–20 mol % of $GeO_2$
>50 mol % of $SiO_2$ (i.e. the remainder)]

This glass can be used to form the core and/or cladding of an optical fibre. In particular, the glass can provide a photosensitive host for rare-earth-ion doping, where phosphorous is required as a constituent or where no germanium is allowed.

The second glass (herein after called glass II) is a glass containing essentially $SnO_2$, $GeO_2$, $SiO_2$ and $B_2O_3$. The preferred compositions are:
1–30 mol % $SnO_2$
2–40 mol % $GeO_2$
0–30 mol % $B_2O_3$
>30 mol % $SiO_2$ (i.e. the remainder)
[A further refined form of this composition may be defined as follows:
1–20 mol % $SnO_2$
2–30 mol % $GeO_2$
0–25 mol % $B_2O_3$
>30 mol % $SiO_2$ (i.e. the remainder)]

For the above glasses, where silica remains the largest single component, the glass is referred to as a silica glass.

Optical fibres with glass II as the core or cladding (or both) in general have greater than a factor of three times larger photo-induced index changes compared to equivalent only germanium-doped silica.

Rare earth ions, i.e. Er, Yb, Nd etc, can be added to either glass I or II at appropriate levels to form an active medium, and fibres with such a glass core can then have gratings written in them to form fibre lasers, particularly short, single-frequency fibre lasers (<2 cm).

In the above glasses, $SnO_2$, $P_2O_5$, and $GeO_2$ raise the refractive index of the core glass, while $B_2O_3$ reduces the refractive index of the core glass. Since a core index higher than the cladding index is required to form waveguides, the composition can be adjusted to give an appropriate refractive index for use either as core or cladding.

The glasses defined above can be used as one or both of the core and cladding. If the glass is used only as the core, or only as the cladding, conventional (non-photosensitive) silica glass can be used for the other part (i.e. the cladding or the core respectively) of the fibre.

The glass I or glass II compositions are particularly suitable for use as core compositions for optical fibres made by vapour-phase deposition. As an example, we give the procedure for making modified chemical-vapour-deposition (MCVD) fibres with the given compositions as core glass.

In the MCVD process, the starting materials are in the form of volatile liquids contained in bubblers. A carrier gas, normally $O_2$ or $N_2$, passes through the liquids to transport the reagents in their vapour phase. The vapour-containing carrier gas is then passed through a rotating silica tube mounted in a glass lathe. A burner (normally an $H_2/O_2$ burner) traverses in the direction of the gas flow. The vapours are oxidized within the high-temperature region near the burner and the resulting soot is deposited on the inner walls of the tube a few centimeters down-stream. The soot is sintered into a layer of clear glass as the burner passes over it. The deposition temperature is normally between 1600° C. and 1800° C.

A number of cladding layers, normally silica optionally doped with $P_2O_5$ or F, are deposited first, followed by a core layer, normally $GeO_2$-doped silica.

For tin doping, an extra bubbler which holds $SnCl_4$ (a volatile liquid) is required. By way of example, the following flow rates for the cladding layers are normally used at a deposition temperature of 1650° C.:

$O_2$ at 600 cc/min
$O_2$ at 500 cc/min to $SiCl_4$ bubbler
$O_2$ at 150 cc/min to $POCl_3$ bubbler
$CCl_2F_2$ at 4.5 cc/min In a following step, two core layers are deposited at a lower temperature (about 1250° C.) with the following flow rates to produce a preform with a $SnO_2/P_2O_5/SiO_2$ core (hereinafter called preform I):

$O_2$ at 600 cc/min
$O_2$ at 25 cc/min to $SiCl_4$ bubbler
$O_2$ at 150 cc/min to $POCl_3$ bubbler
$N_2$ at 400/min cc to $SnCl_4$ All the bubblers are kept at 25.0° C., apart from the $SnCl_4$ bubbler, which is kept at 39° C. to increase the vapour pressure. The two core layers as deposited are porous soot layers (i.e. not fused) and this was found to be appropriate to incorporate $SnO_2$ efficiently. Subsequently, the two core layers are fused to a clear glass at about 1600° C. in a single pass of the burner and the preform is collapsed into a solid rod by raising the burner temperature to about 2000° C. and using about 6 burner passes in the conventional way.

A fibre is then drawn from the preform by heating one end to about 2100° C. in a fibre drawing tower in the conventional way. The resulting fibre is hereinafter called fibre I and was measured to have a numerical aperture of 0.23, first-order mode cut-off wavelength of 1.32 $\mu$m, core radius of 2.16 $\mu$m and loss of 40 dB/km at 1.55

A fibre with glass II as the core can be made by following the same procedures given above, while changing the gas flow for the core layers to:

$O_2$ at 600 cc/min
$O_2$ at 25 cc/min to $SiCl_4$ bubbler
$O_2$ at 100 cc/min to $GeCl_4$ bubbler
$N_2$ at 400 cc/min to $SnCl_4$ bubbler The resulting fibre is hereinafter called fibre II. It was measured to have a numerical aperture of 0.20, first-order mode cut-off wavelength of 1.25 $\mu$m, core radius of 2.4 $\mu$m and loss of 1 dB/km at 1.55 $\mu$m.

$B_2O_3$ can be introduced into fibre I and II by simply introducing $BBr_3$ in the vapour phase or by soaking the porous core layers in a solution containing a soluble boron salt before fusing them to a clear glass.

Fibre gratings can be imprinted in sections of fibre I and II using the set-up illustrated in FIG. 1. In tests, a line-narrowed pulsed KrF excimer laser operating at 248.5 nm has been used as the radiation source. The laser pulse energy is about 20 mJ, the pulse duration 20 ns and the pulse repetition rate 20 Hz. The beam 10 is directed through two focusing lenses 20 and 30 onto a beam splitter 40 and the resulting two beams 50 and 60 are then directed by the mirrors 65, 70 and 110 onto two mirrors 80 and 120. The two mirrors 80 and 120 converge the beams 50 and 60 onto the fibre 100. The interference between the two beams forms a periodic intensity pattern along the fibre core.

Alternatively, a non-uniform grating structure (e.g. a chirped grating having a non-uniform period of the refractive index variation) could be generated using known phase-mask techniques.

Since the core glass index is permanently changed by the radiation, a periodic pattern can be imprinted in the fibre core. However, the cladding glass in fibres I and II is transparent from 190 nm to 3 μm, and therefore has little effect on the writing beams. The fluence used is normally between 0.3 kJ/cm$^2$ and 6 kJ/cm$^2$. The grating length produced by this set-up is about 15 mm in length.

Using this apparatus, a 50% reflectivity grating can be written in fibre I using a writing time of about 3 mins (i.e. about 3600 pulses). This reflectivity and a 15 mm length implies an index change of about $0.5 \times 10^{-4}$. The grating reflectivity decayed to about 45% in the first few minutes after the writing process, but were stable thereafter. When the intensity of the UV writing beam exceeded about 500 mJ/cm$^2$/pulse, gratings with about 100% reflectivity were produced with a single pulse (about 0.8 dB/μm at the writing wavelength). This was found to be caused by optical damage at the core/cladding interface due to the high optical absorption in the core (Type II gratings, see also FIG. 2 for UV absorption of the preform). Such type II gratings can be conveniently produced on-line during fibre drawing before the usual polymer coating is applied and have improved high temperature stability compared to normal gratings. A UV-induced loss of about 0.3 dB/mm is measured at 633 nm, but no induced loss is measured above 900 nm. Type II gratings have only previously been reported in high GeO$_2$-containing fibres.

It will be appreciated that although a writing wavelength of 248.5 nm was used for the grating writing, any radiation with a wavelength below 280 nm can be used because of the broad absorption in the core below this wavelength (FIG. 2). This contrasts with germanosilicate fibres which have only a narrow absorption band centred at about 240 nm. It should also be appreciated that the shorter the wavelength used, the larger will be the photo-induced index change because of the stronger absorption at shorter wavelengths (see FIG. 2).

Gratings with about 100% reflectivity and a bandwidth of 0.75 nm could be produced in a section of fibre II after about 20 minute exposure (about 6 kJ/cm$^2$). The index change in the gratings reaches about $1 \times 10^{-3}$.

Figure 3:
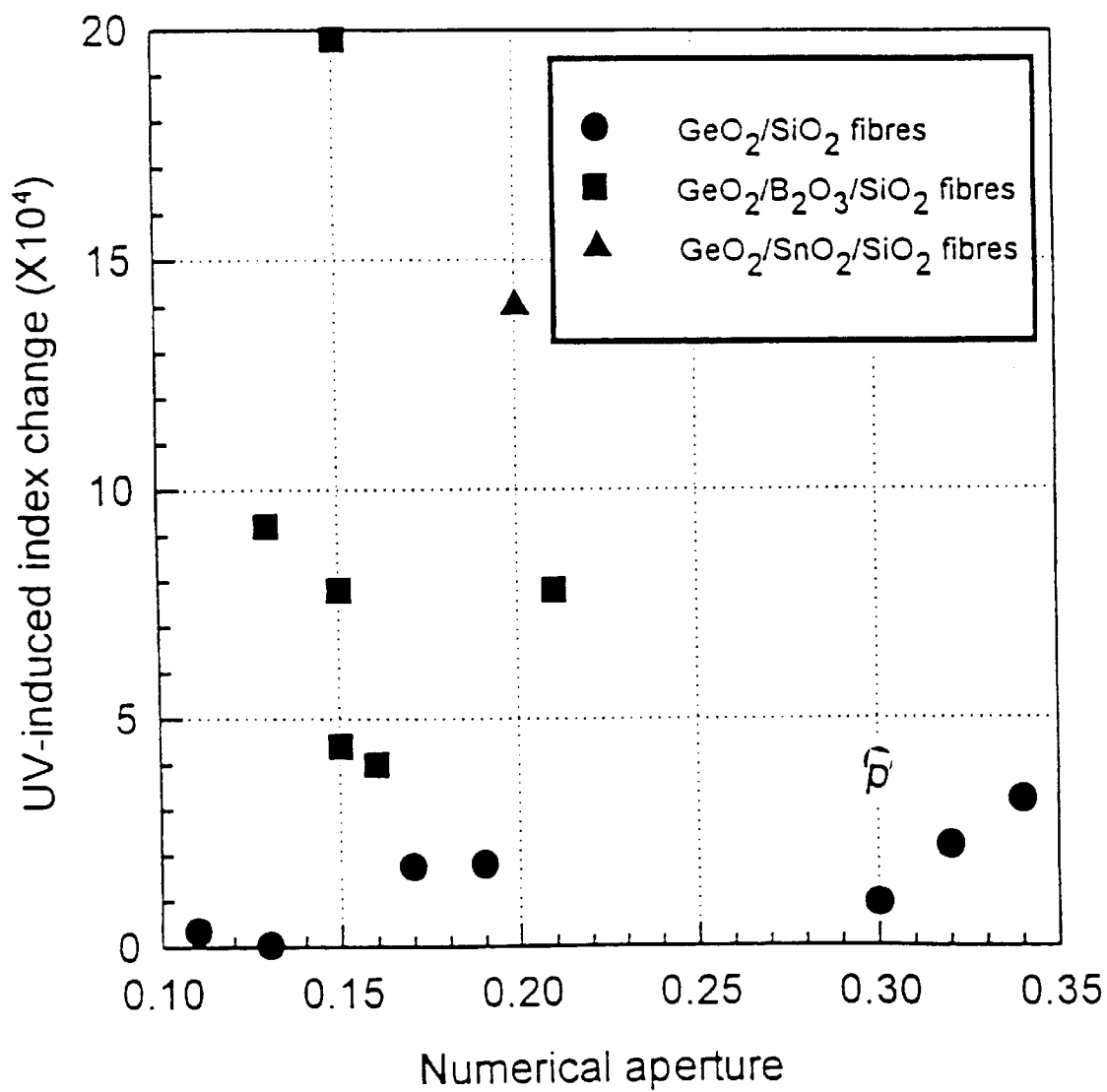
FIG. 3 is a schematic graph showing the UV-induced refractive index changes in three types of glass.

FIG. 3 gives a comparison between saturated photo-induced index changes in fibres of the following core compositions: (a) SiO$_2$/GeO$_2$; (b) SiO$_2$/GeO$_2$/B$_2$O$_3$; and (c) SiO$_2$/GeO$_2$/SnO$_2$ (fibre II). Core compositions (a) and (b) are known from the literature. The photo-induced index changes in fibres with core composition (c) (fibre II) are comparable with those in fibres with core composition (b), and are several times larger than those in fibres with core composition (a).

Figure 4:
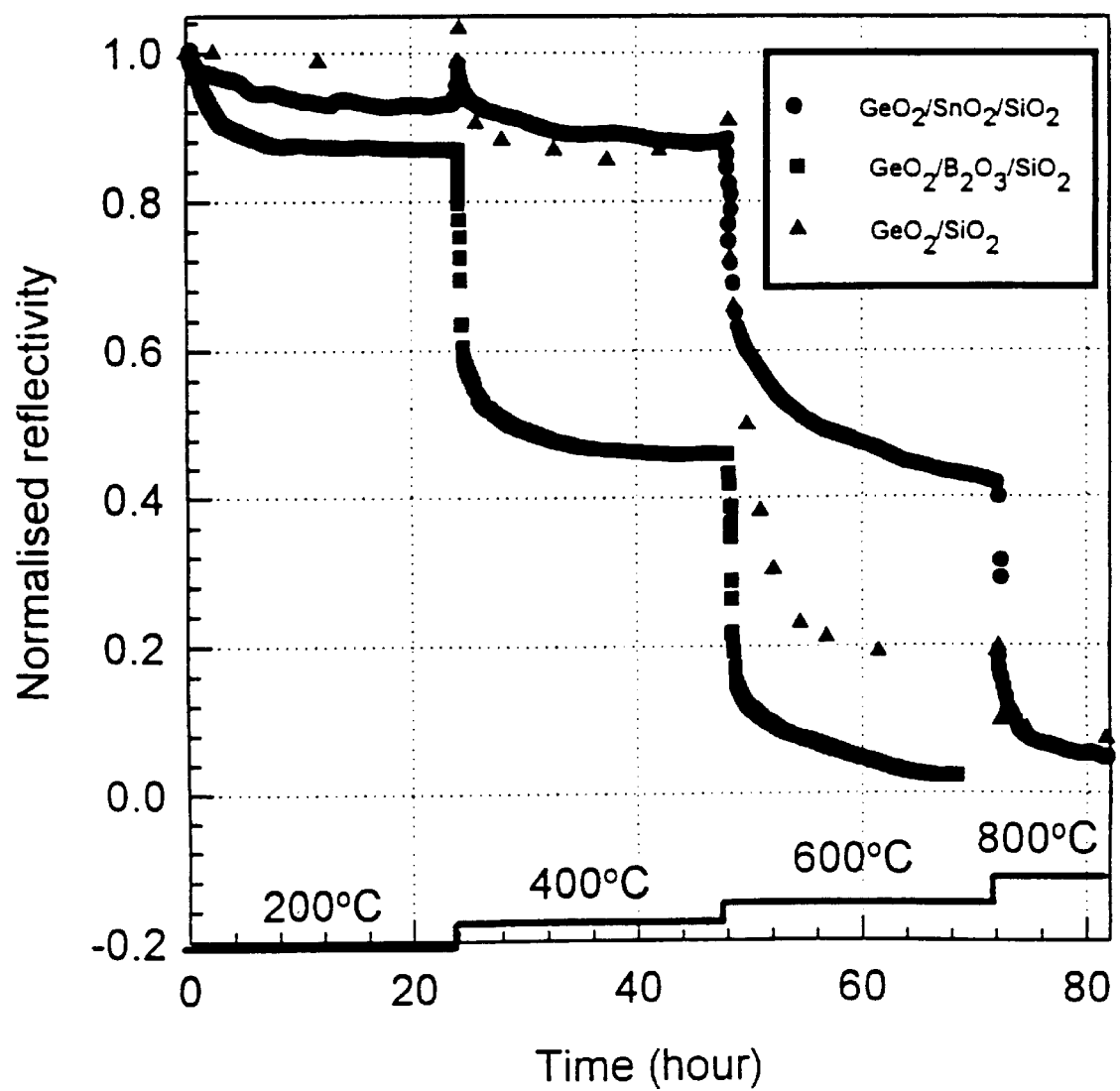
FIG. 4 is a schematic graph showing the decay of the UV-induced index change at elevated temperatures in glasses containing $GeO_2/SiO_2/B_2O_3$, $GeO_2/SiO_2/SnO_2$ and $GeO_2/SiO_2$.

The stability of the gratings is very important, especially for applications at elevated temperatures. As the life time of the gratings is very long at room temperature (several years to tens of years), the gratings are normally tested at elevated temperature to produce accelerated decay. The results of high-temperature stability tests for gratings in fibres with core compositions (b) and (c) are shown in FIG. 4, along with results for a silica glass doped with only germanium. The gratings in fibres with core composition (c) (fibre II) are much more stable than these in fibres with composition (b).

The UV absorption spectrum of preform II is shown in FIG. 2. The peak of the absorption band related to the germanium oxygen-deficient centres is at about 250 nm instead of about 240 nm for solely germanium-doped silica. Thus gratings can therefore be written in fibre II more efficiently by a KrF excimer laser at 248.5 nm, although any writing wavelength below 280 nm is possible.

For eventual use with wavelengths between about 600 nm and 3 μm, the periodic grating pitch formed by the above techniques is preferably in the range of 0.1 μm to 1 μm. For use in coupling modes in a waveguide, the periodic grating pitch is preferably in the range of 1 μm and 1 cm.

The above techniques are suitable for use in single-core or multi-core optical fibres.

Figure 5:
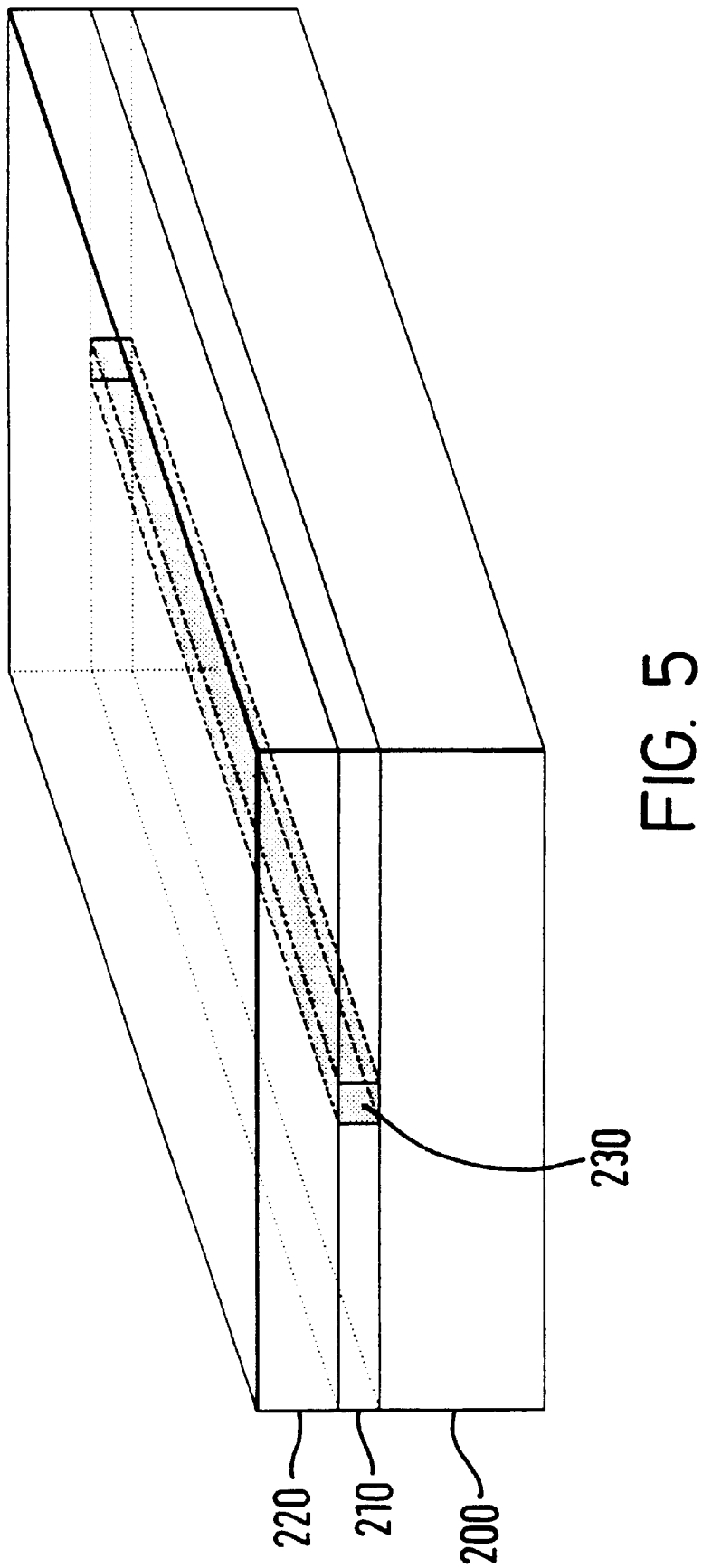
FIG. 5 is a schematic diagram illustrating the fabrication of a planar waveguide.

FIG. 5 is a schematic diagram illustrating the fabrication of a planar waveguide.

The fabrication process is performed on a laminar structure of a substantially non-photosensitive cladding substrate 200, a layer of the tin-doped photosensitive glass 210 as described above, and a further cladding layer 220.

A writing laser beam is directed through the cladding layer 220 (on which it has little or no effect, to reach the layer 210. Here, the laser beam can be used to write a longitudinal track 230 having a raised refractive index (because of interaction between the photosensitive glass and the laser radiation). The track 230 then acts as a light-guiding core, to form a planar waveguide.

If the writing laser beam of FIG. 5 does not saturate the photosensitive response of the layer 210, the two basic techniques outlined above could be combined, to fabricate a planar waveguide with a grating structure superimposed on the track 230. This could be performed by subjecting the track 230 to a further exposure to add the refractive index variation along the track required for the grating.

In all of the glass fabrication techniques described above, further or alternative co-dopants could be selected from the following list: aluminium, gallium, indium, arsenic, antimony, titanium, tantalum, zirconium, niobium, fluorine and lead.

In particular embodiments of the invention falling within the more general ranges described above, the germania-based glass used in standard telecommunications fibre (about 3.7% germania-doped silica glass) can be tin-doped to improve its sensitivity to photo-induced refractive index variation without significantly altering other properties of glass. Thus, optical devices relying on photo-induced refractive index variation can be made which are very well optically matched to other components constructed using non-tin-doped standard telecommunications fibre.

PUBLICATION REFERENCES

1. W. H. Glenn, G. Meltz and E. Snitzer: "Method for impressing gratings within fibre optics", U.S. Pat. No. 4,725,110.
2. K. O. Hill, B. Y. Malo, F. C. Bilodeau and D. C. Johnson: "Method of making Bragg gratings and grating masks therefor", UK patent application No. GB 2,272 075 A.
3. B. J. Ainslie, D. L. Williams, G. D. Maxwell and R. Kashyap: "Photoinduced gratings in B$_2$O$_3$ containing glass", International patent No. WO 94/00784.
4. L Dong, P. J. Wells, D. P. Hand and P. St. J. Russell: "Photosensitivity in Ce$^{3+}$-doped optical fibres", J. Opt. Soc. Am. B, 10, 1993, pp.89–93.
5. E. G. Behrens and R. Powell: "Characteristics of laser-induced gratings in Pr$^{3+}$- and Eu$^{3+}$-doped silicate glasses", J. Opt. Soc. Am. B, 7, 1990, pp.1473–1444.
6. M. M. Broer, A. J. Bruce and W. H. Grodkiewicz: "Photoinduced refractive index change in several Eu$^{3+}$-, Pr$^{3+}$-, and Er$^{3+}$-doped oxide glasses", Phy. Rev. B, 45, 1992, pp.7077–7083.
7. F. Bilodeau, B. Malo, J. Albert, D. C. Johnson and K. O. Hill: "Photosensitization of optical fibre and silica-on-silicon/silica waveguides", Opt. Lett., 18, 1993, pp.953–955.

8. P. J. Lemaire, R. M. Atkins, V. Mizrahi and W. A. Reed: "High pressure $H_2$ loading as a technique for achieving ultrahigh UV photosensitivity and thermal sensitivity in $GeO_2$ doped optical fibres", Elect. Lett., 29, 1993, pp.1191–1193.
9. J. L. Archambault, L. Reekie, L. Dong and P. St. J. Russell: "High reflectivity photorefractive Bragg gratings in germanium-free optical fibres", CLEO, Paper CWK3, May 1994, Anaheim.
10. J. T. Kringlebotn, P. R. Morkel, L. Reekie, J. L. Archambault and D. N. Payne: "High power single frequency erbium:ytterbium fibre laser", ECOC'93 Proc., 2, 1993, p.65.
11. L. Dong, J. Pinkstone, P. St. J. Russell and D. N. Payne: "Ultraviolet absorption in modified chemical vapour deposition preforms", J. Opt. Soc. Am. B, 11, 1994, pp.2106–2111.
12. J. E. Townsend, S. B. Poole, and D. N. Payne :"Solution-doping technique for fabrication of rare-earth doped optical fibres", Elect. Lett., 23, 1987, pp.329–331.
13. L. Reekie, J. L. Archambault and P. St. J. Russell: "100% reflectivity fibre gratings produced by a single excimer laser pulse", OFC/IOOC'93, Paper PD14, 1993, San Jose.
14. L. Dong, J. L. Archambault, L. Reekie, P. St. J. Russell and D. N. Payne: "Single pulse Bragg gratings written during fibre drawing", Elect. Lett., 29, 1993, pp.1577–1578.
15. G. M. Williams, D. A. Dutt, J. A. Ruller and E. J. Friebele: "Permanent photowritten optical gratings in irradiated silicate glasses", Opt. Lett., 17, 1992, pp.532–534.

What is claimed is:

1. An optical waveguide device comprising:
   an optical waveguide formed at least in part of photosensitive optical glass; and
   a refractive index variation optically impressed on the photosensitive optical glass of the waveguide by exposure of regions of the photosensitive optical glass to a refractive index-varying optical radiation,
   characterised in that the photosensitive optical glass is doped with tin as a photosensitising dopant.
2. A device according to claim 1, the device having an optically-induced periodic refractive index variation to form a waveguide grating.
3. A device according to claim 2, in which the period of the refractive index variation is non-uniform.
4. A device according to claim 2, in which the refractive index variation has a uniform period in the range of 0.1 $\mu$m to 1 $\mu$m.
5. A device according to claim 2, in which the refractive index variation has a uniform period in the range of 1 $\mu$m and 1 cm.
6. A device according to claim 1, in which the photosensitive optical glass is photosensitive to ultraviolet radiation.
7. A device according to claim 1, in which the waveguide is a planar waveguide.
8. A device according to claim 1, in which the waveguide is an optical fibre waveguide having at least one light-guiding core surrounded by a cladding material.
9. A device according to claim 8, in which the core is formed of tin-doped glass and the cladding is formed of silica glass.
10. A device according to claim 8, in which the core and the cladding are formed of tin-doped glass.
11. A device according to claim 1, in which the tin-doped glass is tin-doped silica glass.
12. A device according to claim 1, in which the tin-doped glass contains up to 30 mole-percent of tin.
13. A device according to claim 1, in which the tin-doped glass is co-doped with one or more co-dopants selected from the group consisting of:
   up to 40 mole-percent phosphorus;
   up to 40 mole-percent boron; and
   up to 30 mole-percent of germanium.
14. A device according to claim 1, in which the tin-doped glass has up to 15 mole-percent tin, and is co-doped with one or more co-dopants selected from the group consisting of:
   up to 20 mole-percent phosphorus;
   up to 20 mole-percent boron; and
   up to 20 mole-percent germanium.
15. A device according to claim 1, in which the tin-doped glass is co-doped with one or more co-dopants selected from the group consisting of:
   up to 40 mole-percent germanium; and
   up to 30 mole-percent boron.
16. A device according to claim 1, in which the tin-doped glass has up to 20 mole-percent tin, and is co-doped with one or more co-dopants selected from the group consisting of:
   between 2 and 30 mole-percent germanium; and
   up to 25 mole-percent boron.
17. A device according to claim 1, in which the tin-doped glass contains up to 15 mole-percent of tin.
18. A device according to claim 1, in which the tin-doped optical glass is co-doped with one or more co-dopants selected from the group consisting of:
   aluminium, gallium, indium, arsenic, antimony, titanium, tantalum, zirconium, niobium, fluorine and lead.
19. A method of fabricating an optical waveguide, the method comprising the steps of:
   providing a photosensitive optical glass which has been doped with tin as a photosensitizing dopant; and
   exposing regions of the tin-doped photosensitive optical glass to refractive index change-inducing optical radiation, the exposed regions providing a light-guiding core of raised refractive index within the tin-doped photosensitive optical glass.
20. A method according to claim 19, in which the tin-doped optical glass is formed as a layer sandwiched between layers of non-photosensitive cladding glass.
21. A process for increasing the sensitivity of optical glass to light-induced refractive index variation, the process comprising the steps of:
   doping the optical glass with tin for increasing the sensitivity of the optical glass to light-induced refractive index variation; and
   exposing regions of the tin-doped photosensitive optical glass to refractive index-varying optical radiation to vary the refractive index of the exposed regions of the tin-doped photosensitive optical glass.

* * * * *